United States Patent Office 3,784,562
Patented Jan. 8, 1974

3,784,562
METHYL ACETOACETIC ESTER ENAMINE OF D-2-(1,4-CYCLOHEXADIEN-1-YL)GLYCINE, SODIUM SALT-DIMETHYLFORMAMIDE ADDUCT
Friedrich Dürsch, Hopewell, N.J., assignor to E. R. Squibb & Sons, Inc., Princeton, N.J.
No Drawing. Filed June 21, 1972, Ser. No. 265,078
Int. Cl. C07c 69/74
U.S. Cl. 260—468 J      5 Claims

ABSTRACT OF THE DISCLOSURE

The dimethylformamide adduct of methyl acetoacetic ester enamine of D-2-(1,4-cyclohexadien-1-yl)glycine, sodium salt and its method of preparation are disclosed.

A new class of synthetic penicillins and cephalosporins derived form D-2-(1,4-cyclohexadien-1-yl)glycine have been reported (U.S. Pat. 3,485,819 and J. Med. Chem. 14 (1971) 117). These compounds are usually prepared by reacting the methyl acetoacetic ester enamine of D-2-(1,4-cyclohexadien-1-yl)glycine, sodium salt (MECG) having the structure:

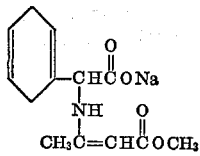

with the appropriate cephalosporanic or penicillanic acid via an activated acid derivative, for example a mixed anhydride. The recent commercial interest in these antibiotics has required the production of substantial amounts of MECG. Unfortunately, a lack of stability to storage of MECG does not permit the production of large quantities of said enamine for use over extended periods of time. This results in an inefficient utilization of plant time and presents numerous production problems. Thus considerable effort has been expended in finding ways to stabilize MECG. It has now been found that a more stable form of this valuable compound can be prepared by forming a dimethylformamide adduct of said compound which permits large scale production and storage of said enamine.

This invention relates to the dimethylformamide adduct of methyl acetoacetic ester enamine of D-2-(1,4-cyclohexadien-1-yl)glycine, sodium salt (MECG) and its method of preparation.

The preparation of the dimethylformamide adduct of MECG may be achieved by crystallization from dimethylformamide of the MECG which is prepared according to the procedure described by Dolfini, et al. [J. Med. Chem. 14 (1971) 117]. The crystallization temperature range generally used is from about 50° C. to the boiling point of dimethylformamide although the preferred temperature range is from about 75° to about 110° C. The ratio of MECG to solvent may be varied considerably to suit the available manufacturing equipment. Generally, the crystallization is performed at 20 g. (MECG) to 200 g. MECG per liter of dimethylformamide. In the interest of economy, the higher concentration is preferred.

In addition, the adduct may be prepared conveniently without isolating and purifying the MECG. The MECG is generally prepared using an alcohol as the solvent, preferably methanol. Upon completion of the reaction forming the MECG, dimethylformamide is added and the pot temperature is raised to about 65 to 90° C. at atmospheric pressure causing the methanol to be distilled out of the reaction vessel. Generally, after a period of time, additional dimethylformamide is added and the pressure is reduced to remove the last traces of methanol and water formed during the preparation of the MECG. Upon cooling, the MECG-DMF adduct crystallizes. In the preferred embodiment seed crystals of MECG-DMF are employed to avoid supersaturation.

The pure MECG-DMF, after filtering and drying at about 40° C. in a vacuum drier, analyzes for:

$$C_{13}H_{16}NNaO_4 + C_3H_7NO$$

(1:1). This novel crystalline material has the following unique X-ray diffraction pattern using copper Kα radiation:

| $2\theta$ | Relative intensities |
|---|---|
| 2.36 | Very weak. |
| 2.54 | Do. |
| 2.60 | Do. |
| 2.65 | Weak. |
| 2.72 | Very weak. |
| 2.77 | Moderate. |
| 2.84 | Weak. |
| 2.89 | Do. |
| 2.92 | Do. |
| 3.03 | Do. |
| 3.18 | Do. |
| 3.24 | Moderate. |
| 3.38 | Do. |
| 3.47 | Weak. |
| 3.54 | Do. |
| 3.66 | Moderate. |
| 3.69 | Do. |
| 3.79 | Strong. |
| 3.95 | Very strong. |
| 4.10 | Strong. |
| 4.28 | Moderate. |
| 4.39 | Do. |
| 4.49 | Strong. |
| 4.71 | Do. |
| 5.08 | Very weak. |
| 5.33 | Moderate. |
| 5.45 | Do. |
| 5.59 | Strong. |
| 5.85 | Very weak. |
| 6.15 | Do. |
| 6.4 | Weak. |
| 7.1 | Very weak. |
| 10.3 | Very strong. |
| 11.0 | Moderate. |
| 12.2 | Do. |

The crystals generally appear as stout rods which undergo endothermic changes at about 115° C. (de-solvation), at about 175° C. (DMF evaporation) and at about 260° C. (decomposition).

The following comparisons demonstrate the enhanced stability of the MECG-DMF adduct over pure MECG.

Potency of MECG and MECG-DMF adduct after storage at 40° C. expressed as a percentage of initial potency.

|  | 1 month | 3 months |
|---|---|---|
| MECG | 88 | 73 |
| MECG-DMF adduct | 100 | 97 |

Performance of MECG and MECG-DMF adduct in the manufacturing process for the prepartion of cephradine after storage at 40° C. expressed as a percentage of the initial performance.

|  | 1 month | 3 months |
|---|---|---|
| MECG | 92 | Failure |
| MECG-DMF adduct | 101 | 92 |

Thus in the form of the MECG-DMF adduct, MECG may be stored for extended periods.

At the time of reaction, the adduct may be used directly or the MECG may be regenerated by removal of the DMF employing method, such as fluid bed drying at about 80°, vacuum drying at elevated temperature, or displacement with another solvent, preferably acetone.

The following examples describe in detail the preparation of the MECG-DMF adduct.

EXAMPLE 1

Preparation of MECG-DMF adduct from MECG

Dimethylformamide (DMF, 1.0 liter) is heated in a beaker to 80° C. Methyl acetoacetate (5 grams) is added and solid MECG (1 c., 200 grams) is introduced in portions with agitation. Agitation at 80 to 90° C. is continued until the solids are substantially in solution. The mixture is filtered through preheated equipment and the filtrate is allowed to cool gradually with agitation. MECG seeds are added from time to time until crystallization of the product commences. The slurry is cooled slowly and is maintained at about 20° C. for 2 to 5 hours. The product is isolated by filtration and washed with fresh sufficient DMF to remove adhering mother liquor. The moist crystals are dried in a vacuum of about 1 mm. at 40° C. until no further weight loss occurs. MECG-DMF adduct is obtained as a white crystal powder (about 215 grams or 85 mole-percent).

EXAMPLE 2

Preparation of MECG-DMF adduct from D-2-(1,4-cyclohexadienyl)glycine

Solid DHPG (200 grams) is slurried in methanol (1.50 liters). A commercial solution of sodium methoxide (25% in methanol; 280 ml.) is added and the mixture is agitated until the solids are substantially dissolved. Activated charcoal (10 grams) and filter aid (30 grams) are added and the mixture is filtered. The filtrate is transferred into a flask equipped for vacuum distillation and is heated to gentle reflux. Methyl acetoacetate (180 ml.) is added. A precipitate is formed that redissolves upon further heating. The clear solution is concentrated at atmospheric pressure until about 1.2 liters of methanol are removed. Dimethylformamide (1.0 liter) is added and the distillation is continued until the pot temperature approaches 100° C. More DMF is added as required to keep the liquid level constant. A vacuum is applied to maintain the pot temperature between 85 and 100° C. while slow distillation takes place until the distillate is substantially free of water. The dark solution is cooled slowly and seeds of MECG-DMF are added in intervals until crystallization commences. The crystal slurry is gradually cooled and is agitated at about 20° C. for 2 to 5 hours. The product is isolated by filtration and a wash with fresh DMF until the effluent is colorless. The moist crystals are dried in a fluidized bed dryer at an air inlet temperature of about 50° C. until the temperature differential across the bed has disappeared. Pure MECG-DMF adduct is obtained (about 385 grams or 85 mol).

What is claimed is:

1. The dimethylformamide adduct of methyl acetoacetic ester enamine of D-2-(1,4-cyclohexadien-1-yl)glycine, sodium salt.

2. A process for the preparation of the compound of claim 1 which comprises dissolving the methyl acetoacetic ester enamine of D-2-(1,4-cyclohexadien-1-yl)glycine, sodium salt in dimethylformamide at a temperature between about 75° C. to 110° C. and crystallizing said product compound by cooling below said range.

3. A process for the preparation of the compound of claim 1 which comprises adding methyl acetoacetate to a lower alcohol solution of D-dihydrophenylglycine, Na salt, warming said reaction mixture until a solution results, adding dimethylformamide, distilling off the lower alcohol and water, cooling and recovering the resulting crystals.

4. The process of claim 3 wherein said lower alcohol is methanol.

5. The process of claim 3 wherein seed crystals are employed during the cooling step to aid crystallization.

References Cited

Adv. in Organic Chem., vol. 4 (Szmuszkovicz, pp. 9–12), Interscience Publishers (1963).

Dolfini, J. E. et al., Journal of Medicinal Chem., vol. 14, No. 2, pp. 117–119.

LORRAINE A. WEINBERGER, Primary Examiner

P. J. KILLOS, Assistant Examiner